United States Patent
Zheng et al.

(10) Patent No.: US 11,335,895 B2
(45) Date of Patent: May 17, 2022

(54) MICRO-CAPSULE TYPE SILICON-CARBON COMPOSITE NEGATIVE ELECTRODE MATERIAL AND PREPARING METHOD AND USE THEREOF

(71) Applicant: JIANGSU DAOYING TECHNOLOGY CO., LTD., Jiangsu (CN)

(72) Inventors: Honghe Zheng, Jiangsu (CN); Siming Yang, Jiangsu (CN); Xueying Zheng, Jiangsu (CN); Xiaohui Zhang, Jiangsu (CN)

(73) Assignee: JIANGSU DAOYING TECHNOLOGY CO., LTD., Jiangsu (CN)

( * ) Notice: Subject to any disclaimer, the term of this patent is extended or adjusted under 35 U.S.C. 154(b) by 372 days.

(21) Appl. No.: 16/344,480

(22) PCT Filed: Sep. 18, 2018

(86) PCT No.: PCT/CN2018/106160
§ 371 (c)(1),
(2) Date: Apr. 24, 2019

(87) PCT Pub. No.: WO2019/052572
PCT Pub. Date: Mar. 21, 2019

(65) Prior Publication Data
US 2020/0058921 A1    Feb. 20, 2020

(30) Foreign Application Priority Data
Sep. 18, 2017   (CN) .......................... 201710839171.7

(51) Int. Cl.
| | |
|---|---|
| *H01M 4/134* | (2010.01) |
| *H01M 4/133* | (2010.01) |
| *H01M 4/62* | (2006.01) |
| *H01M 4/04* | (2006.01) |
| *H01M 4/38* | (2006.01) |
| *H01M 10/0525* | (2010.01) |
| *H01M 4/02* | (2006.01) |

(52) U.S. Cl.
CPC ......... *H01M 4/0404* (2013.01); *H01M 4/133* (2013.01); *H01M 4/134* (2013.01); *H01M 4/386* (2013.01); *H01M 4/622* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2016/0172665 A1* | 6/2016 | Zhou | ...................... | H01M 4/587 |
| | | | | 429/338 |
| 2018/0123124 A1* | 5/2018 | Yang | ...................... | H01M 4/386 |
| 2018/0254476 A1* | 9/2018 | Fujiwara | ............... | H01M 4/587 |
| 2018/0375089 A1* | 12/2018 | Gonser | ............. | H01M 10/0525 |
| 2019/0074508 A1* | 3/2019 | Ha | .......................... | H01M 4/133 |

FOREIGN PATENT DOCUMENTS

| | | | | |
|---|---|---|---|---|
| CN | 103022448 | | 4/2013 | |
| CN | 105576248 | | 5/2016 | |
| CN | 105720258 | A * | 6/2016 | |
| CN | 105720258 | A | 6/2016 | |
| CN | 107658450 | | 2/2018 | |
| JP | 2000-11997 | A | 1/2000 | |
| JP | 2007-80827 | A | 3/2007 | |
| JP | 2014-192064 | A | 10/2014 | |
| JP | 2015-90845 | A | 5/2015 | |
| WO | WO-2016136543 | A1 * | 9/2016 | ............ H01M 4/587 |
| WO | WO 2017/026268 | A1 | 2/2017 | |
| WO | WO 2017/026269 | A1 | 2/2017 | |

OTHER PUBLICATIONS

International Search Report for PCT/CN2018/106160 dated Nov. 20, 2018, 4 pages.
Written Opinion of the ISA for PCT/CN2018/106160 dated Nov. 20, 2018, 4 pages.
Canadian Office Action dated Jul. 3, 2020 in Canadian Application No. 3,035,900, 7 pages.
Canadian Office Action dated Jan. 20, 2021 in Canadian Application No. 3,035,900, 4 pages.
The Second Office Action dated Jan. 15, 2021 in Chinese Application No. 201710839171.7, with English translation, 13 pages.
Notice of Reasons for Refusal dated Apr. 7, 2020 in Japanese Application No. 2019-528666, with English translation, 13 pages.
Notice of Reasons for Refusal dated Jan. 12, 2021 in Japanese Application No. 2019-528666, with English translation, 5 pages.

* cited by examiner

*Primary Examiner* — Tracy M Dove
(74) *Attorney, Agent, or Firm* — Nixon & Vanderhye P.C.

(57) ABSTRACT

The present invention discloses a micro-capsule type silicon-carbon composite negative electrode material, and the negative electrode material comprises a current collector and a silicon-carbon coating layer formed by drying silicon-carbon paste coating the current collector; the silicon-carbon slurry comprises a carbonaceous paste and silicon capsule powder dispersed in the carbonaceous paste; the carbonaceous paste comprises a dispersing agent, and a carbon material, a first conductive agent and a first binder dispersed in the dispersing agent; the silicon capsule powder has micro-capsule structures comprising silicon powder and a second binder coating the surface of the silicon powder and in which the silicon powder is a core and the second binder is an outer shell; and the first binder is different from the second binder. The improved silicon-carbon composite negative electrode material of the present disclosure has excellent effects in cycle performance, coulombic efficiency and rate capability.

13 Claims, No Drawings

MICRO-CAPSULE TYPE SILICON-CARBON COMPOSITE NEGATIVE ELECTRODE MATERIAL AND PREPARING METHOD AND USE THEREOF

This application is the U.S. national phase of International Application No. PCT/CN2018/106160 filed Sep. 18, 2018 which designated the U.S. and claims priority to CN 201710839171.7 filed Sep. 18, 2017, the entire contents of each of which are hereby incorporated by reference.

TECHNICAL FIELD OF THE INVENTION

The present disclosure relates to the lithium-ion battery electrode field, and in particular, relates to a micro-capsule type silicon-carbon composite negative electrode material and a preparing method and use thereof.

BACKGROUND OF THE INVENTION

The silicon material has a high lithium storage capacity, its theoretical capacity is about 4200 mAh/g, and the actual specific capacity exceeds 3000 mAh/g, which is very likely to replace graphite materials as an important negative electrode material for the next generation of high-specific energy lithium batteries. However, there are three most important technical problems which the application of silicon materials faces. First, the silicon particles undergo a drastic change in the volume of silicon materials during the intercalation and deintercalation of lithium ions, and the expansion ratio can reach 300%, thereby causing the problems that the silicon particles is powdered and the capacity of the electrode slice rapidly declines. Second, the initial coulomb efficiency of the silicon material is not high. And third, the stability of the SEI film on the silicon surface is poor, especially the damage and growth in the process of volume change results in serious lithium consumption problems. In order to solve the above problems, people mainly start with three aspects, one is the embellishment and modification of silicon materials, including the particle size control and the surface control of silicon materials, and the composite with carbon materials, and the like. The second is the selection of suitable binder systems, especially the selection of binder systems with three-dimensional network type cross-linked structure, including cross-linked alginate system, cross-linked polyacrylamide system, etc., and the current research in this aspect has also achieved good results. The third is the selection of an excellent electrolyte system, especially the electrolyte system containing fluoroethylene carbonate (FEC) which shows good performance.

In the prior art, one of the choices for the industrialization application of silicon materials is silicon-carbon composite. In fact, there are many ways of silicon-carbon composite, including in-situ growth of carbon materials compressing amorphous carbon, carbon nanotube and graphene, etc. on the surface of silicon materials. However, the preparation process of this material is very complicated, and silicon oxide and silicon carbide are easily formed during the growth of carbon materials, which will affect the performance of silicon materials. Another way is the mechanical mixing of silicon particles and carbon materials, which is easy to mix the two evenly, especially the mechanical mixing of silicon powder and graphite material has been industrialized. Generally, about 10% of silicon particles can be mixed in the graphite powder for the production of carbon negative electrode slice with a capacity beyond 400 mAh/g. Although this manufacturing method is simple and easy to implement, the prominent problem to be faced is that the capacity of the electrode rapidly fades, and the silicon material can hardly perform its proper performance after about 200 cycles, which has a great impact on the lifetime of high specific energy batteries.

Aiming at the above problems, some improvements have been made in the prior art, for example, the Chinese invention patent CN103022448A discloses a preparing method of silicon-carbon negative electrode material of lithium battery, comprising the following steps: 1) adding 50 to 90 parts by weight of micron-sized silicon powder to a ball-milling tank, and adding a solvent to perform ball milling; 2) adding 10 to 50 parts by weight of natural graphite to the industrial silicon powder ball-milled in the step 1), and continuing the ball milling; 3) drying the material ball-milled in the step 2), and grinding the dried material to obtain an active material; 4) weighing 70 to 80 parts by weight of the active material, 5 to 20 parts by weight of sodium alginate, and 5 to 20 parts by weight of acetylene black, adding deionized water in the mass ratio of deionized water to sodium alginate of 1:5 to 1:1, stirring evenly, coating on copper foil, and drying to obtain the silicon-carbon negative electrode material. Although this patent achieves an increase in the initial coulomb efficiency of the electrode slice (more than 70%) to some extent, it is still unsatisfactory, and the long-term cycle performance does not meet the high requirements (the degradation is obvious after 50 cycles), and there was no improvement on the rate capability of the electrode slice.

SUMMARY OF THE INVENTION

The technical problems to be solved by the present disclosure is to overcome the deficiencies of the prior art, and to provide an improved silicon-carbon composite negative electrode material, and the micro-capsule type silicon-carbon composite negative electrode material of the present disclosure has excellent effects in cycle performance, coulombic efficiency and rate capability.

The present disclosure further provides a method for preparing the micro-capsule type silicon-carbon composite negative electrode material.

The present disclosure further provides use of the micro-capsule type silicon-carbon composite negative electrode material in preparation of a lithium ion battery electrode slice.

To solve the above problems, one technical solution employed by the present disclosure is as follows:

A micro-capsule type silicon-carbon composite negative electrode material comprises a current collector and a silicon-carbon coating layer formed by drying silicon-carbon paste coating the current collector; the silicon-carbon slurry comprises a carbonaceous paste and silicon capsule powder dispersed in the carbonaceous paste; the carbonaceous paste comprises a dispersing agent, and a carbon material, a first conductive agent and a first binder dispersed in the dispersing agent; the silicon capsule powder comprises silicon powder and a second binder coating the surface of the silicon powder, and micro-capsule structures are formed by the second binder and the silicon powder coated with the second binder; the first binder is different from the second binder.

The micro-capsule structures are solid particulates or particles formed by coating the second binder on the silicon powder surface, and the solid particulates or particles take the silicon powder as cores and the second binder as outer shells coating on the silicon powder surface.

According to a preferred aspect of the present disclosure, the first binder and the second binder are insoluble, poorly soluble or slightly soluble to each other when the silicon capsule powder is dispersed into the carbonaceous paste.

According to a more preferred aspect of the present disclosure, the first binder is sodium carboxymethylcellulose and/or styrene butadiene rubber, and the second binder is selected from alginate, polyacrylate, arabic gum, guar gum, hyalurate, and combinations thereof.

According to some preferred aspects of the present disclosure, the second binder is a binder to which calcium ions and/or copper ions are added, wherein a mass fraction of the calcium ions and/or the copper ions to the second binder is 2-15%. Wherein the addition of copper ions and/or calcium ions can make the stability and mechanical properties of the outer shell formed by the binder better. In some specific implementations, other components capable of cross-linking the binder can also be added to obtain a modified binder which enables the shell formed by the binder to have strong mechanical properties and stability. More preferably, the second binder is a binder to which calcium ions and/or copper ions are added, wherein the mass fraction of the calcium ions and/or the copper ions to the second binder is 5-12%.

In some specific and preferred implementations of the present disclosure, a weight ratio of the carbon material to the silicon powder is (2-10):1 in the silicon-carbon paste.

In some specific and preferred implementations of the present disclosure, mass fractions of the silicon powder and the second binder to raw material of the silicon capsule powder are 70-95% and 2-15% respectively.

In some specific and preferred implementations of the present disclosure, mass fractions of the carbon material, the first binder and the first conductive agent to the carbonaceous paste are 90-98%, 1-5% and 0.5-5% respectively.

In some specific implementations of the present disclosure, the silicon powder is nano silicon and/or micro silicon.

In some specific implementations of the present disclosure, the carbon material is selected from natural graphite, artificial graphite, pyrolytic carbon, hard carbon material, and combinations thereof.

In some specific implementations of the present disclosure, the dispersing agent is water, or a mixed solvent of an alcohol and water.

In some specific implementations of the present disclosure, the first conductive agent is selected from acetylene black, Super P, Super S, carbon fiber, carbon nanotube, graphene, and combinations thereof.

In some specific implementations of the present disclosure, preferably, the silicon capsule powder further comprises a second conductive agent, and the second conductive agent is selected from acetylene black, Super P, Super S, carbon fiber, carbon nanotube, graphene, and combinations thereof.

The present disclosure provides another technical solution, a preparing method of the micro-capsule type silicon-carbon composite negative electrode material, wherein the preparing method comprises following steps:

(a) preparation of the silicon capsule powder: dispersing the silicon powder and the second binder of the silicon capsule powder in the dispersing agent to obtain a siliceous paste, then drying the siliceous paste, and grinding to obtain the silicon capsule powder having micro-capsule structures in which the silicon powder is a core and the second binder is an outer shell; wherein a second conductive agent is added to the dispersing agent, or not;

(b) preparation of the carbonaceous paste: dispersing powder of the carbon material, the first binder, and the first conductive agent in the dispersing agent to obtain the carbonaceous paste;

(c) preparation of the silicon-carbon paste: adding the silicon capsule powder prepared in said Step (a) to the carbonaceous paste prepared in said Step (b) when the preparation of the carbonaceous paste is about to be completed or is completed, or after the preparation of the carbonaceous paste is completed, and then mixing and stirring to obtain the silicon-carbon paste;

(d) preparation of the micro-capsule type silicon-carbon composite anode material: coating the silicon carbon paste prepared in said Step (c) on the current collector, and drying to obtain the micro-capsule type silicon-carbon composite anode material.

The present disclosure provides yet another technical solution, use of the micro-capsule type silicon-carbon composite negative electrode material in preparation of a lithium ion battery electrode slice.

Due to the use of the above technical solutions, the present disclosure has the following advantages over the prior art:

In the negative electrode material of the present disclosure, the silicon powder and the carbon material are respectively placed in different binder environments, and the silicon powder is completely coated by the second binder to form a micro-capsule structure, so that the activities of silicon and carbon are utilized to a maximum extent, and the long-term cycle performance of the electrode slice is greatly improved, which is increased from the original significant fading after 200 cycles to almost no fading, the internal resistance of the electrode slice is obviously lowered, the rate performance is greatly improved, and the mechanical stability of the electrode slice is remarkably improved, the initial coulombic efficiency of the electrode slice is greatly improved, and therefore the silicon-carbon negative electrode material of the present disclosure is of great significance to the development of future high specific energy and long life lithium ion batteries.

DETAILED DESCRIPTION OF EXEMPLARY EMBODIMENTS

Based on the reality of the demand for high-specific energy lithium batteries, the present disclosure provides a silicon-carbon composite negative electrode material having a micro-capsule structure, and in particular, firstly, a binder suitable for silicon particles is mixed and dispersed together with silicon particles, to uniformly coat the surface of the silicon particle with a binder having good compatibility therewith, and the stability of the binder is preferably further strengthened by a cross-linking technique to form microcapsule structures in which the silicon particle is a core and the cross-linking modified binder is an outer shell. Then, based on the time around which the preparation of the carbon matter (graphite) paste nowadays is basically completed, the silicon capsule powder is added and stirred to uniformly disperse the silicon capsule powder in the carbonaceous paste, thus forming a situation that silicon is in a suitable binder for silicon and carbon is in a binder suitable for carbon (preferably the two different binders are insoluble, poorly soluble or slightly soluble to each other, but without a distinct phase interface), so as to form a silicon-carbon paste, and then the silicon-carbon paste is coated on the current collector, and dried to obtain a microcapsule type silicon-carbon composite negative electrode material, which can be processed into an electrode slice for a lithium ion battery, and an outstanding feature of the electrode slice is that is contains two kinds of different binders, which ensures that each active material works in its most suitable binder environment, avoids the problems of poor cycle performance and low coulombic efficiency and poor rate performance of the electrode slice in the prior art, and is an important technology and approach for the development of high-capacity, long-life silicon-carbon composite electrodes in the future.

A preparing method of the micro-capsule type silicon-carbon composite negative electrode material of the present disclosure, comprises following steps: (a) dispersing silicon powder (employing nano silicon or micro silicon common used in lithium batteries), a second binder and a second conductive agent (preferably added, or not added) in a dispersing agent, stirring and mixing to obtain a siliceous paste, then drying the siliceous paste in a suitable temperature (preferably 60 to 90° C.), and grinding to obtain silicon capsule powder having micro-capsule structures in which the silicon powder is a core and the second binder is an outer shell; the second binder is selected from alginate, polyacrylate, arabic gum, guar gum, hyalurate, and combinations thereof; (b) dispersing powder of the carbon material, the first binder, and the first conductive agent in a dispersing agent, mixing and stirring evenly to obtain the carbonaceous paste; the first binder is sodium carboxymethylcellulose and/or styrene butadiene rubber; (c) adding the silicon capsule powder to the carbonaceous paste when the preparation of the carbonaceous paste is about to be completed or is completed, or after the preparation of the carbonaceous paste is completed, and then continuing to stir for about 30 min to obtain the silicon-carbon paste; (d) coating the obtained silicon-carbon paste on the current collector, the coating thickness is preferably 40 to 200 micrometer, and drying (preferably 60° C.) to obtain the micro-capsule type silicon-carbon composite negative electrode material. In the preparation of the mixed silicon capsule powder, it is preferred to use a second binder rich in carboxyl or hydroxyl groups, which is advantageous for film formation on the silicon surface to improve the initial coulombic efficiency of the material, and preferably, the second binder is a binder to which calcium ions and/or copper ions are added, wherein the calcium ions and/or the copper ions account for 2 to 15% by mass of the second binder, more preferably, the calcium ions and/or the copper ions account for 5 to 12% by mass of the second binder, the calcium ions and/or the copper ions are added in the forms such as $CaCl_2$, $CaSO_4$, $CuCl_2$ and $CuSO_4$. Further cross-linking modification of the binder not only reduces the possibility of its dissolution in the carbonaceous paste, but also suppresses the volume effect of the silicon during the cycle process, and when it is mixed with the carbonaceous paste, the silicon and carbon can be placed in their optimal binder environment, which is beneficial to improve the electrical properties of the electrode slice. Both the first conductive agent and the second conductive agent are selected from acetylene black, Super P, Super S, carbon fiber, carbon nanotube, graphene and combinations thereof; both the dispersing agents used in the step (a) and the step (b) can be water, or a mixed solvent of an alcohol and water. Wherein, a weight ratio of the carbon material to the silicon powder is controlled to be (2-10):1, and the silicon powder and the second binder respectively account for 70 to 95% and 2 to 15% by mass of the silicon capsule powder, and preferably, the silicon capsule powder further comprises a second conductive agent of 0.01 to 15% by mass of the silicon capsule powder; the carbon material, the first binder and the first conductive agent respectively account for 90 to 98%, 1 to 5%, and 0.5 to 5% by mass of the carbonaceous paste.

In the following, the specific embodiments are combined to further explain the present disclosure in detail. It should be understood that, those embodiments are to explain the basic principle, major features and advantages of the present disclosure, and the present disclosure is not limited by the scope of the following embodiments. The implementation conditions employed by the embodiments may be further adjusted according to particular requirements, and undefined implementation conditions usually are conditions in conventional experiments. In the following embodiments, all raw materials are commercially purchased, unless otherwise specified.

Embodiment 1

The present embodiment provides a micro-capsule type silicon-carbon composite negative electrode material, which is prepared according to the following method:

(a) silicon powder (100 nm), sodium alga acid and acetylene black were dispersed in water in a mass ratio of 80:15:5, and stirred thoroughly, to give a evenly mixed siliceous paste; the siliceous paste was dried at 80° C., ground thoroughly and sieved to obtain silicon capsule powder having micro-capsule structures in which the silicon powder is core and the second binder is outer shell;

(b) powder of graphite, sodium carboxymethylcellulose, styrene butadiene rubber and acetylene black were dispersed in water in a mass ratio of 95:2:1:2 and stirred thoroughly, to give a evenly mixed graphite paste;

(c) the silicon capsule powder was added to the graphite paste when the preparation of the graphite paste is about to be completed, and a weight ratio of graphite to the silicon powder was controlled to be 3:1, and then the mixture was continued to be stirred for 30 min to obtain a silicon-carbon paste; (d) the obtained silicon-carbon paste was coated on the current collector, and dried at 60 □ to obtain the micro-capsule type silicon-carbon composite negative electrode material.

The obtained micro-capsule type silicon-carbon composite negative electrode material was made into a negative electrode slice, and a lithium slice was used as a counter electrode to assemble a 2032 button cell battery. The electrolyte solution was EC/DMC/DEC solution of a volume ratio of 1:1:1 with 1M $LiPF_6$ as a conductive salt, and added with FEC as an additive which accounts for 10% by mass of the electrolyte; the assembled battery was sealed, and after standing, the electrochemical performance under the constant current conditions was tested on a charge and discharge tester (where the charge and discharge rate was 0.2 C, the voltage range was 0.01 to 1 V).

Embodiment 2

The present embodiment provides a micro-capsule type silicon-carbon composite negative electrode material, which is prepared according to the following method: its preparing steps were basically the same as that in Embodiment 1 and differ in that: in step (a), silicon powder, sodium alga acid and acetylene black were in a mass ratio of 80:15:0.

Embodiment 3

The present embodiment provides a micro-capsule type silicon-carbon composite negative electrode material, which is prepared according to the following method: its preparing steps were basically the same as that in Embodiment 1 and differ in that: in step (a), the second binder was a binder added with calcium ions, wherein, the calcium ions were added in the form of CaCl$_2$, and a mass ratio of the added calcium ions to sodium alga acid was 2:25.

Embodiment 4

The present embodiment provides a micro-capsule type silicon-carbon composite negative electrode material, which is prepared according to the following method: its preparing steps were basically the same as that in Embodiment 1 and differ in that: in step (a), the second binder was a binder added with copper ions, wherein, the copper ions were added in the form of CuSO$_4$, and a mass ratio of the added copper ions to sodium alga acid was 1:10.

Embodiment 5

The present embodiment provides a micro-capsule type silicon-carbon composite negative electrode material, which is prepared according to the following method: its preparing steps were basically the same as that in Embodiment 1 and differ in that: in step (a), the employed second binder was arabic gum, and silicon powder, arabic gum and acetylene black were in a mass ratio of 80:10:5.

Embodiment 6

The present embodiment provides a micro-capsule type silicon-carbon composite negative electrode material, which is prepared according to the following method: its preparing steps were basically the same as that in Embodiment 1 and differ in that: in step (a), the employed second binder was guar gum, and silicon powder, guar gum and acetylene black were in a mass ratio of 80:10:10, and the employed first binder was a mixture of sodium carboxymethylcellulose and styrene butadiene rubber.

Embodiment 7

The present embodiment provides a micro-capsule type silicon-carbon composite negative electrode material, which is prepared according to the following method: its preparing steps were basically the same as that in Embodiment 1 and differ in that: in step (a), the employed second binder was sodium hyaluronate, and silicon powder, sodium hyaluronate and acetylene black were in a mass ratio of 75:15:10, and the employed first binder was a mixture of sodium carboxymethylcellulose and styrene butadiene rubber.

Embodiment 8

The present embodiment provides a micro-capsule type silicon-carbon composite negative electrode material, which is prepared according to the following method: its preparing steps were basically the same as that in Embodiment 1 and differ in that: in step (c), a weight ratio of graphite to silicon powder was 4:1.

Comparison 1

The present embodiment provides a silicon-carbon composite negative electrode material, which is prepared according to the following method: its preparing steps were basically the same as that in Embodiment 1 and differ in that: in step (a), sodium alga acid was not added, and the same amount of sodium carboxymethylcellulose was added.

Comparison 2

The present embodiment provides a silicon-carbon composite negative electrode material, which is prepared according to the following method: its preparing steps were basically the same as that in Embodiment 1 and differ in that: in step (b), sodium carboxymethylcellulose was not added, and the same amount of sodium alga acid was added.

Performance Test

The following performance of the electrode slices prepared in the above Embodiments 1-8 and Comparisons 1-2 were tested, and the specific results are shown in Table 1.

TABLE 1

Electrochemical performance of negative electrode slices for lithium ion batteries in Embodiments 1-8 and Comparisons 1-2

|  | Initial reversible discharge capacity/mAh/g | Initial coulombic efficiency/% | Capacity retention ratio after 200 cycles at 25 □ | 10 C discharge capacity/ mAh/g |
| --- | --- | --- | --- | --- |
| Embodiment 1 | 933.2 | 85.82 | 95.2 | 619 |
| Embodiment 2 | 930.2 | 84.19 | 94.9 | 600 |
| Embodiment 3 | 896.7 | 84.73 | 94.5 | 530 |
| Embodiment 4 | 939.4 | 85.24 | 93.6 | 515 |
| Embodiment 5 | 911.3 | 83.34 | 92.9 | 502 |
| Embodiment 6 | 912.2 | 84.28 | 92.7 | 488 |
| Embodiment 7 | 879.3 | 83.34 | 87.9 | 502 |
| Embodiment 8 | 821.2 | 86.28 | 90.1 | 488 |
| Comparison 1 | 878.6 | 84.54 | 31.8 | 37.2 |
| Comparison 2 | 887.3 | 83.19 | 32.4 | 35.4 |

It can be seen from the test results in the above table that the cycle performance of the electrode slices made of the micro-capsule silicon-carbon composite negative electrode material with novel geometric structure is greatly improved. After 200 cycles, the capacity retention rate of the electrode slices rises to nearly 90% which is about 30% for the conventional electrode slices, indicating that the lifetime of the electrode slices has been greatly improved. Moreover, the rate performance of the micro-capsule silicon-carbon composite electrode slices is also significantly increased, which is raised from about 30 mAh/g of the conventional electrode slices to about 600 mAh/g under the 10C discharge condition, and 20 times higher. It can be seen that the present disclosure overcomes the disadvantages of the conventional silicon-carbon hybrid electrode slices in terms of rate and cycle, and the cycle performance and rate performance of the electrode slices are greatly improved. The electrode slice of this new geometry is of great significance for the development of future high specific energy and long life lithium ion batteries. The embodiments described above are only for illustrating the technical concepts and features of the present disclosure, and are intended to make those skilled in the art being able to understand the present disclosure and thereby implement it, and should not be concluded to limit the protective scope of this invention. Any equivalent variations or modifications according to the present disclosure should be covered by the protective scope of the present disclosure.

What is claimed is:

1. A silicon-carbon composite negative electrode material, comprising a current collector and a silicon-carbon coating layer formed by drying silicon-carbon slurry coating the current collector, wherein the silicon-carbon slurry comprises carbonaceous paste and silicon capsule powder dispersed in the carbonaceous paste, and the carbonaceous paste comprises a dispersing agent, and a carbon material, a first conductive agent and a first binder dispersed in the dispersing agent; the silicon capsule powder has micro-capsule structures comprising silicon powder and a second binder coating the surface of the silicon powder and in which the silicon powder is a core and the second binder is an outer shell;

the first binder and the second binder are different and insoluble, poorly soluble or slightly soluble to each other when the silicon capsule powder is dispersed into the carbonaceous paste, the first binder is at least one selected from the group consisting of sodium carboxymethylcellulose and styrene butadiene rubber, and the second binder is selected from the group consisting of alginate, polyacrylate, arabic gum, guar gum, hyalurate, and combinations thereof.

2. The silicon-carbon composite negative electrode material according to claim 1, wherein the second binder is added with at least one selected from the group consisting of calcium ions and copper ions, wherein a mass fraction of the at least one selected from the group consisting of calcium ions and copper ions to the second binder is 2-15%.

3. The silicon-carbon composite negative electrode material according to claim 1, wherein a weight ratio of the carbon material to the silicon powder is (2-10):1 in the silicon-carbon slurry.

4. The silicon-carbon composite negative electrode material according to claim 1, wherein mass fractions of the silicon powder and the second binder are 70-95% and 2-15% respectively, and mass fractions of the carbon material, the first binder and the first conductive agent are 90-98%, 1-5% and 0.5-5% respectively.

5. The silicon-carbon composite negative electrode material according to claim 1, wherein the silicon powder is at least one selected from the group consisting of nano silicon and micro silicon; the carbon material is selected from the group consisting of natural graphite, artificial graphite, pyrolytic carbon, hard carbon material and combinations thereof; the dispersing agent is water, or a mixed solvent of an alcohol and water; the first conductive agent is selected from the group consisting of acetylene black, Super P, Super S, carbon fiber, carbon nanotube, graphene and combinations thereof.

6. The silicon-carbon composite negative electrode material according to claim 1, wherein the silicon capsule powder further comprises a second conductive agent, and the second conductive agent is selected from the group consisting of acetylene black, Super P, Super S, carbon fiber, carbon nanotube, graphene and combinations thereof.

7. A preparing method of the silicon-carbon composite negative electrode material according to claim 1, wherein the preparing method comprises following steps:

(a) preparation of the silicon capsule powder: dispersing the silicon powder and the second binder of the silicon capsule powder in the dispersing agent to obtain a siliceous paste, then drying the siliceous paste, and grinding to obtain the silicon capsule powder having micro-capsule structures in which the silicon powder is the core and the second binder is the outer shell;

(b) preparation of the carbonaceous paste: dispersing powder of the carbon material, the first binder, and the first conductive agent in the dispersing agent to obtain the carbonaceous paste;

(c) preparation of the silicon-carbon slurry: adding the silicon capsule powder prepared in said Step (a) to the carbonaceous paste prepared in said Step (b) when the preparation of the carbonaceous paste is about to be completed or is completed, or after the preparation of the carbonaceous paste is completed, and then mixing and stirring to obtain the silicon-carbon slurry;

(d) preparation of the silicon-carbon composite negative material: coating the silicon carbon slurry prepared in said Step (c) on the current collector, and drying to obtain the silicon-carbon composite negative material.

8. The preparing method according to claim 7, wherein in said step (a), a second conductive agent is added to the dispersing agent.

9. The preparing method according to claim 8, wherein the second conductive agent is selected from the group consisting of acetylene black, Super P, Super S, carbon fiber, carbon nanotube, graphene and combinations thereof.

10. The preparing method according to claim 7, wherein the second binder is added with at least one selected from the group consisting of calcium ions and copper ions, wherein a mass fraction of the at least one selected from the group consisting of calcium ions and copper ions to the second binder is 2-15%.

11. The preparing method according to claim 7, wherein a weight ratio of the carbon material to the silicon powder is (2-10):1 in the silicon-carbon slurry.

12. The preparing method according to claim 7, wherein mass fractions of the silicon powder and the second binder are 70-95% and 2-15% respectively, and mass fractions of the carbon material, the first binder and the first conductive agent are 90-98%, 1-5% and 0.5-5% respectively.

13. The preparing method according to claim 7, wherein the silicon powder is at least one selected from the group consisting of nano silicon and micro silicon; the carbon material is selected from the group consisting of natural graphite, artificial graphite, pyrolytic carbon, hard carbon material and combinations thereof the dispersing agent is water, or a mixed solvent of an alcohol and water; the first conductive agent is selected from the group consisting of acetylene black, Super P, Super S, carbon fiber, carbon nanotube, graphene and combinations thereof.

* * * * *